United States Patent

[11] 3,586,400

| [72] | Inventors | Knut Einar Wallin<br>Goteborg;<br>Erik Magnus Kellström, Partille, both of,<br>Sweden |
|------|-----------|---|
| [21] | Appl. No. | 807,704 |
| [22] | Filed | Mar. 17, 1969 |
| [45] | Patented | June 22, 1971 |
| [73] | Assignee | Aktiebalaget Svenska Kullagerfabriken<br>Goteborg, Sweden |
| [32] | Priority | Mar. 20, 1968 |
| [33] | | Sweden |
| [31] | | 3648 |

[54] BEARING ASSEMBLY OF THE SPIRAL GROOVE TYPE
4 Claims, 1 Drawing Fig.

| [52] | U.S. Cl. | 308/160 |
|------|----------|---------|
| [51] | Int. Cl. | F16c 17/06 |
| [50] | Field of Search | 308/160, 168, 172, 1 |

[56] References Cited
UNITED STATES PATENTS

| 3,338,645 | 8/1967 | Pribnow | 308/160 |
|-----------|--------|---------|---------|

FOREIGN PATENTS

| 191,503 | 10/1956 | Austria | 308/160 |
| 930,055 | 7/1955 | Germany | 308/160 |

*Primary Examiner*—Fred C. Mattern, Jr.
*Assistant Examiner*—Frank Susko
*Attorney*—Howson and Howson

ABSTRACT: An assembly comprising a rotor and a base, said rotor and base having confronting bearing surfaces, an intermediate member in the form of a thin flexible disc disposed between said confronting bearing surfaces and separate drive means for rotating said intermediate member, the opposite faces of said intermediate member having spiral grooves.

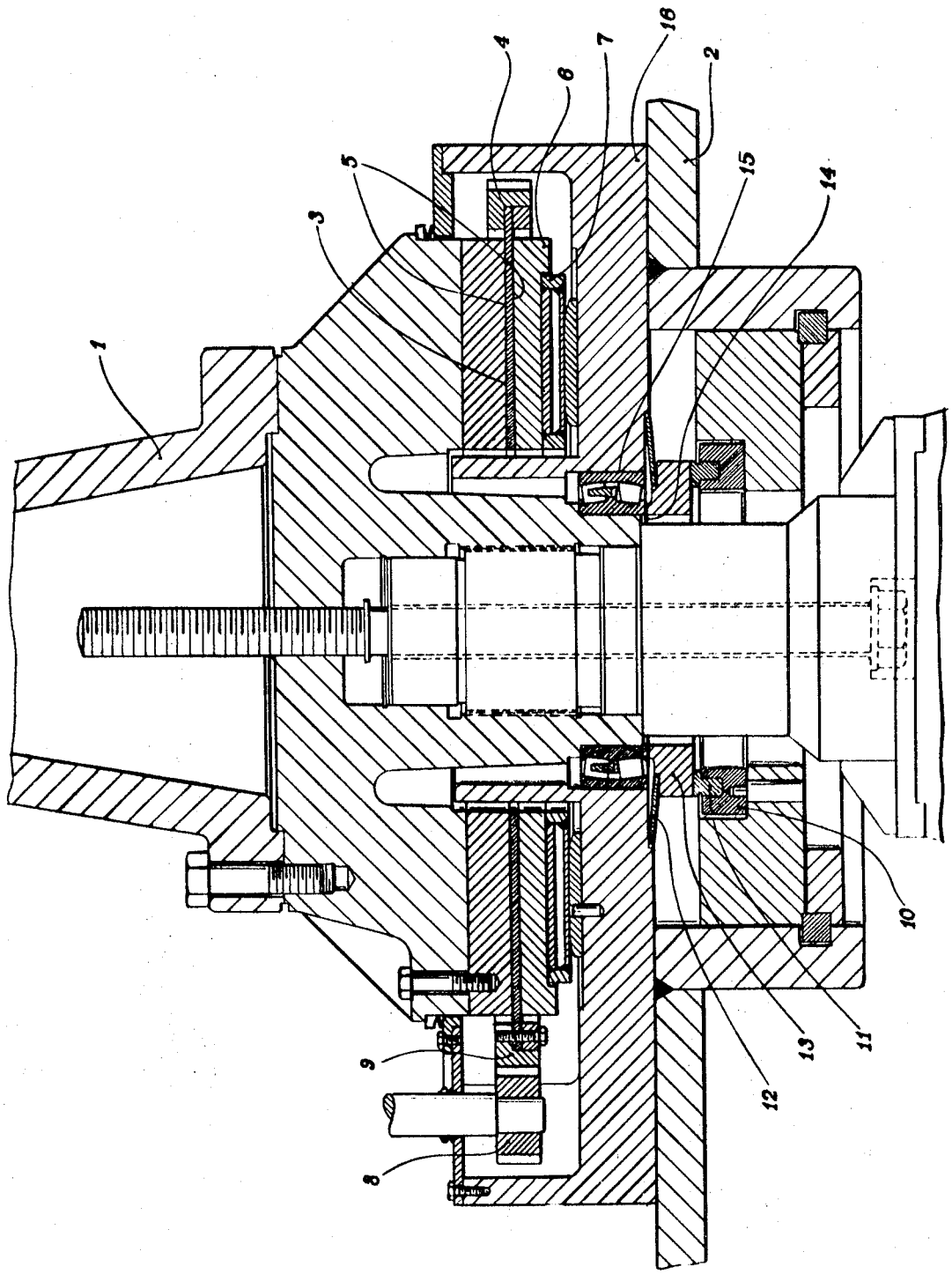
INVENTOR
KNUT EINAR WALLIN
ERIK MAGNUS KELLSTRÖM
Howson & Howson
ATTORNEYS

BEARING ASSEMBLY OF THE SPIRAL GROOVE TYPE

The present invention refers to a bearing assembly of spiral groove type intended for carrying thrust loads and comprising two spiral groove bearings having an intermediate member which may be actuated to rotate with for instance a speed higher than that of a slowly rotating shaft which loads the bearings.

At slowly rotating machine members, for instance a rotor of a heat exchanger, the rate of rotation is not sufficient to, by means of spiral groove bearings, build up a pressure in the bearing surfaces great enough for carrying the axial bearing load, which generally is very great. Moreover, the rotating mass of such rotors is considerable, which involves that starting up and stopping takes long time. This involves the risk of metallic contact between the loaded bearing surfaces. To obtain a sufficiently thick oil film it is necessary in existing assemblies to use a very viscous oil. When starting up the assembly at low temperatures this oil is, however, so viscous, that very great moments are required.

To eliminate these difficulties it is proposed according to the invention that the bearing assembly comprises a separate intermediate member which rotates independently of the shaft supported and thereby may be given a rate of rotation greater than that of the shaft. The sliding rate in the bearing surface required to build up a lubricant film of suitable thickness is thereby obtained even if a lubricant having a low viscosity is used. It is also possible to bring the intermediate member to rotate before the start, whereby the load of the inoperative shaft may be supported by a disengaging member arranged in a suitable manner.

The invention will hereinafter be more completely described in connection to the drawing attached, on which the FIGURE shows an embodiment of a bearing assembly where the disengagement is effected by a hydraulic jack. The embodiment shows a bearing assembly for a heat exchanger having a rotor shaft 1 which transfers all of the rotor weight to a baseplate 2. The rotor shaft rotates with a very low rate of revolution—1 to 2 r.p.m. The end surface 3 of the rotor is shaped as a plain bearing surface which cooperates with an intermediate member 4. This is on both sides provided with spiral grooves 5 and may for instance be made by a thin, flexible disc. The member 4 rests against a plain disc 6 connected to the baseplate 2 via a hydraulic adjustment device 7. The member 4 may by the aid of a separate driving device comprising for instance a gear 8 and a gear ring 9 be rotated independently of the rotor shaft 1 which is driven by a separate motor.

When the rotor shaft is at standstill and is to be started up the rotor 1 is first lifted by an annular jack 10. The piston 11 of the jack is normally pressed to the bottom by a ring 13 actuated by a spring 12. A small clearance 14 then appears at the end face of an inner ring 15 of one of the rotor bearings. When the rotor shaft is lifted the member 4 is disengaged and may be brought to rotate freely. When a required rate of revolution is attained to build up a sufficient pressure in the spiral groove bearings by means of the spiral grooves 5 provided on both end planes of said intermediate member and a lubricant in a bearing housing 16, the rotor may be lowered. The rotor may then be brought to rotate at a desired rate of revolutions. By choosing an opposite direction of rotation of the member 4 relative to that of the rotor shaft 1 the bearing assembly will function for some time even if the driving of the intermediate member for instance by an accident should stop while the rotor shaft, which requires longer time to stop, still rotates. The bearing assembly may also be made so that the sliding surfaces are separated during start by oil which is pressed in by a separate pump between the sliding surfaces either in the spiral grooves or in radially contiguous smooth lands on these surfaces.

The embodiment described is only to be seen as an example as the invention may be modified in several ways, in cases where a spiral groove bearing assembly having an intermediate member rotated by a separate driving device, is to be applied.

We claim:

1. An assembly comprising a rotor and a base, said rotor and base having confronting bearing surfaces, an intermediate member in the form of a thin flexible disc disposed between said confronting bearing surfaces and separate drive means for rotating said intermediate member, the opposite faces of said intermediate member having spiral grooves.

2. An assembly as claimed in claim 1 wherein said intermediate member rotates in a direction opposite to that of the direction of rotation of the rotor.

3. An assembly according to claim 1, characterized thereby that thrust load at start is carried by a disengaging device during the time necessary for the intermediate member to be rotated.

4. An assembly according to claim 1, characterized thereby that the intermediate member during start is relieved thereby, that a lubricant is pressed into the bearing surfaces on both sides of the intermediate member.